Patented Feb. 1, 1949

2,460,779

UNITED STATES PATENT OFFICE 2,460,779

SYNTHESIS OF PHTHALOCYANINES FROM ω-CHLORINE OR ω-BROMINE SUBSTITUTED o-TOLUNITRILES

Robert E. Brouillard, Bound Brook, N. J., and Erwin Baumgarten, Westerleigh, Staten Island, N. Y., assignors to American Cyanamid Company, New York, N. Y., a corporation of Maine No Drawing. Application June 2, 1947, Serial No. 751,989

10 Claims. (Cl. 260—314.5)

This invention relates to a new process for preparing phthalocyanine pigments.

Phthalocyanine pigments, particularly copper phthalocyanine, have achieved large commercial importance because of their valuable color characteristics. In the past these pigments have been prepared on a large scale from phthalic anhydride or phthalonitrile. These processes have introduced considerable practical difficulties which have been reflected in increased costs.

When the phthalonitrile process is used, expensive and complicated equipment is required for the high temperature catalytic conversion of phthalic anhydride into phthalonitrile; this step is also subject to a considerable explosion hazard because of the danger of cracking ammonia at the high temperatures used. When phthalic anhydride is used directly without first forming the nitrile, a hard fused reaction mass is obtained which is particularly difficult to stir and heat evenly and involves crushing and grinding operations after the pigment has been formed.

Both of the processes starting from phthalic anhydride or phthalonitrile are also subject to the disadvantage that it is difficult to produce many substituted phthalocyanine pigments. In some cases pigments which are theoretically possible cannot be produced by this method.

The disadvantages of the prior processes for producing phthalocyanine pigments are avoided in the present invention by using as a starting material omega halogeno o-tolunitriles. These compounds are then reacted with ammonia or a compound capable of generating ammonia at reaction temperature in the presence of metalliferous reagents containing metals having atomic numbers 27 to 29. The mechanism of the reaction is not entirely clear and it is not intended to limit the present invention to any particular reaction theory.

The omega chloro or bromo o-tolunitriles used in the present invention may have from 1 to 3 halogen atoms in the methyl group. They include such compounds as ω-chloro-o-tolunitrile, ω, ω-dichloro-o-tolunitrile, ω, ω, ω-trichloro-o-tolunitrile, and the various ω-bromo-o-tolunitriles such as ω,ω-dibromo-o-tolunitrile. The omega chloro or bromo o-tolunitriles may also carry nuclear substituents. Typical of such substituents are fluorine, chlorine, bromine, nitro, carboxy, sulfo and trifluoromethyl.

It is an advantage of the present invention that the omega halogeno-o-tolunitriles may be prepared by conventional methods which are useful in side chain halogenation. For example, halogenating agents such as chlorine, bromine, sulfuryl chloride, phosphorus pentachloride, and the like, may be employed. In addition, conditions aiding side chain halogenations such as irradiation with ultra-violet light may be employed as well as catalysts when necessary. The degree of replacement of hydrogen atoms in the methyl groups with chlorine or bromine atoms is readily controllable by the customary variations in reaction conditions, it being an added advantage that close or critical control is entirely unnecessary because the exact number of chlorine or bromine atoms introduced is immaterial.

The omega chloro or bromo o-tolunitriles react with the same type of nitrogen compounds as does phthalic anhydride to form phthalocyanine pigments. That is to say, they react with compounds such as ammonia and those which are capable of generating ammonia under the reaction conditions. Such compounds, for example, are urea, guanylurea, biuret and the like. These compounds need to possess no particular high degree of purity. In fact, mixtures of these compounds give as good or in some cases better yields than do the pure reagents. This is an additional advantage of the process of the present invention.

The ratios of omega chloro or bromo o-tolunitrile to the nitrogen containing reactants may vary widely although, of course, the nitrogen containing compound must be present at least in stoichiometric amounts. In general, a small excess has been found desirable. The amount of excess will vary somewhat from one reagent to another and also with the conditions of the reaction.

It is an advantage of the present invention that the mode and speed of addition of the nitrogen containing reactant is not critical. For example, the whole amount may be added in a single portion either before or after the omega chloro or bromo o-tolunitrile has been added to the reaction mixture. It is equally feasible to add the nitrogen containing compound in small portions either in the initial stages of the reaction or during the entire period.

The metal phthalocyanines which may be produced by the process of the present invention include copper phthalocyanine, cobalt phthalocyanines and nickel phthalocyanines. That is to say, phthalocyanines of the metals having atomic numbers 27 to 29. A metalliferous reagent containing the desired metal must, of course, be used. Examples of such metalliferous reagents are copper powder, cupric chloride, cuprous chloride, cupric bromide, cupric sulfate, cobalt chloride, nickel chloride and the like. The amount of metalliferous reagent is also not critical although here again at least a stoichiometric amount of the metal bearing compound must be used in order to produce a completely metallized pigment. A small excess is sometimes desirable but large excesses are unnecessarily wasteful and while they do not interfere with the reaction, any large excess of metalliferous agent will create an additional separation problem.

The reaction medium may be varied. Good results are obtained when the reactants are fused without the use of any solvents. In many cases, however, an organic solvent is desirable. Excellent results are obtained as far as the reaction is concerned and the solvent also increases the fluidity of the reaction mixture. Various types of organic solvents may be used. We prefer to use organic solvents having a slight oxidizing action, such as, for example, aromatic nitro compounds. Nitrobenzene because of its ready availability is one of the best solvents to use, and it exerts a particularly beneficial effect. It is by no means necessary to add enough solvent to dissolve all of the reactants. On the contrary, the amount of solvent which renders the reaction mixture fluid and stirrable is quite adequate.

It is another advantage of the present invention that temperature control is not critical. The reaction will proceed within a range of 150–250° C. Optimum temperature will vary with the reagents, the solvent used and the time and speed of reaction desired. Usually optimum results will be obtained within a preferred temperature range of 180–200° C.

The process may be carried out under ordinary pressure or in an autoclave. The latter will normally be advantageous where gaseous or very volatile reagents are employed.

The pigments obtained by the process of the present invention are readily purified and do not introduce any problem which is more difficult than that encountered in the ordinary processes which have been used hitherto. The present invention, therefore, is not concerned primarily with any particular method of isolating or purifying the pigments. The standard procedures may be employed. We have found that a very efficient method is to use filtration followed by washing off the filter cake with solvents such as alcohol and water. The filtration may be of the reaction mixture alone when sufficient solvent has been employed or the reaction mixture may be drowned in water and the resulting slurry may then be filtered.

In addition to the advantages presented by the process of the present invention in the production of known phthalocyanine pigments, it is possible now to produce substituted pigments which were hitherto either unknown or not economically produceable.

The present process, when used with a solvent avoids difficulties attendant on the old methods in which the reaction has become a hard solid mass. In this preferred modification of the present invention a final product is obtained which can be isolated without crushing or leaching.

The pigments obtained by the process of the present invention show comparatively high purity, and have decidedly bright shades. For many purposes they require no further treatment. However, the pigments may be purified or conditioned in the usual ways. For example, by acid pasting and wet or dry grinding and blending. The pigments are also susceptible to treatment with a crystallizing liquid such as xylene followed by grinding with a dry-grinding agent in order to produce solvent stable pigments.

The invention will be illustrated in greater detail in conjunction with the following specific examples. The parts are by weight.

Example 1

A mixture of 5 parts of $\omega$-chloro-o-tolunitrile, 67 parts of nitrobenzene, and 1 part of anhydrous cupric chloride is heated for about 20 minutes to 120° C. while ammonia is being passed through the reaction mixture. The mixture is then refluxed until pigment formation is complete. The resulting mixture is filtered hot and the filter cake washed successively with nitrobenzene, acetone, dilute hydrochloric acid, dilute sodium hydroxide, and water. The copper phthalocyanine thus obtained is dried to give a bright blue pigment of good quality which may be purified further by acid pasting or other suitable means.

Example 2

A mixture of 5 parts of $\omega$-chloro-o-tolunitrile, 1 part of anhydrous cupric chloride, 56 parts nitrobenzene and 15 parts of urea is refluxed until pigment formation is substantially complete. The reaction mixture is filtered hot and the filter cake washed successively with nitrobenzene, acetone, dilute hydrochloric acid, dilute sodium hydroxide, and water. The copper phthalocyanine thus obtained is dried to give a bright blue which may be purified further if desired.

Example 3

A mixture of 10 parts of $\omega,\omega$-dichloro-o-tolunitrile, 3.5 parts of anhydrous cupric chloride, and 56 parts of nitrobenzene is refluxed while a current of ammonia is passed through until pigment formation is substantially complete. The bright blue pigment so obtained is isolated and purified in the same manner as is the product obtained by the procedure described in Example 1.

Example 4

A mixture of 5 parts of $\omega,\omega$-dichloro-o-tolunitrile, 2 parts of anhydrous cupric chloride, and 56 parts of nitrobenzene is heated in an atmosphere of ammonia to about 200° C. at 450 psi. pressure in an autoclave until pigment formation is complete. The bright blue copper phthalocyanine pigment so obtained is isolated and purified in the same manner as is the product obtained by the procedure described in Example 1.

Example 5

A mixture of 5 parts of $\omega,\omega$-dichloro-o-tolunitrile, 2 parts of cupric chloride, 56 parts nitrobenzene, and 15 parts of urea is refluxed until pigment formation is substantially complete. The blue copper phthalocyanine pigment so formed is isolated and purified in the same manner as is the product obtained by the procedure in Example 2.

Example 6

A mixture of 5 parts of $\omega,\omega$-dibromo-o-tolunitrile, 1 part anhydrous cupric chloride, 57 parts of nitrobenzene and 5 parts of urea is refluxed until pigment formation is complete. The reaction mixture is worked up and the bright blue pigment so obtained purified in the same manner as is the product obtained by the procedure described in Example 2.

Example 7

A mixture of 5 parts of ω,ω-dibromotolunitrile, 1 part of anhydrous cupric chloride, and 57 parts of nitrobenzene is heated at reflux temperature while ammonia is being passed through the reaction mixture, until pigment formation is substantially complete. The blue phthalocyanine pigment so obtained is isolated and purified in the same manner as is the product obtained by the procedure described in Example 1.

Example 8

A mixture of 10 parts ω,ω,ω-trichloro-o-tolunitrile, 3 parts of anhydrous copper sulfate, 10 parts of urea, and 56 parts of nitrobenzene is heated at reflux temperature until pigment formation is substantially complete. The reaction mixture is worked up and the bright blue pigment so obtained purified in the same manner as is the product obtained by the procedure described in Example 1.

What we claim is:

1. A process for preparing phthalocyanine pigments which comprises reacting an omega halogeno o-tolunitrile, the halogen having an atomic weight of at least 35 and not more than 80, at a temperature of 150–250° C. with a compound selected from the group consisting of ammonia and compounds capable of generating ammonia at the reaction temperature and mixtures thereof, and a metalliferous reagent, the metal of which has an atomic number of 27 to 29.

2. A process for preparing phthalocyanine pigments which comprises reacting an omega chloro o-tolunitrile at a temperature from 150–250° C. with a compound selected from the group consisting of ammonia and compounds capable of generating ammonia at the reaction temperature and mixtures thereof, and a metalliferous reagent, the metal of which has an atomic number of 27 to 29.

3. A process for preparing copper phthalocyanine pigments which comprises reacting an omega halogeno o-tolunitrile, the halogen having an atomic weight of at least 35 and not more than 80, at a temperature from 150–250° C. with a compound selected from the group consisting of ammonia and compounds capable of generating ammonia at the reaction temperature and mixtures thereof in an organic solvent in the presence of a cupriferous reagent.

4. A process for preparing copper phthalocyanine pigments which comprises reacting an omega chloro o-tolunitrile at a temperature from 150–250° C. with a compound selected from the group consisting of ammonia and compounds capable of generating ammonia at the reaction temperature and mixtures thereof in an organic solvent in the presence of a cupriferous reagent.

5. A process according to claim 1 in which the reaction is carried out in an organic solvent.

6. A process according to claim 2 in which the reaction is carried out in an organic solvent.

7. A process according to claim 3 in which the reaction is carried out in a nitrobenzene reaction medium.

8. A process according to claim 4 in which the reaction is carried out in a nitrobenzene reaction medium.

9. A process for producing copper phthalocyanine which comprises reacting omega-chloro-o-tolunitrile with urea in nitrobenzene at 150–220° C. in the presence of cupric chloride.

10. A process for producing copper phthalocyanine which comprises reacting ω,ω,ω-trichloro-o-tolunitrile with urea in nitrobenzene at 150–220° C. in the presence of cupriferous reagent.

ROBERT E. BROUILLARD.
ERWIN BAUMGARTEN.

No references cited.